(12) United States Patent
Chandraker et al.

(10) Patent No.: US 8,879,851 B2
(45) Date of Patent: *Nov. 4, 2014

(54) SHAPE FROM DIFFERENTIAL MOTION WITH UNKNOWN REFLECTANCE

(71) Applicant: NEC Laboratories America, Inc., Princeton, NJ (US)

(72) Inventors: Manmohan Chandraker, Santa Clara, CA (US); Kai Yu, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/716,294

(22) Filed: Dec. 17, 2012

(65) Prior Publication Data

US 2013/0156327 A1  Jun. 20, 2013

Related U.S. Application Data

(60) Provisional application No. 61/576,059, filed on Dec. 15, 2011.

(51) Int. Cl.
| | |
|---|---|
| *G06K 9/00* | (2006.01) |
| *F21S 8/10* | (2006.01) |
| *G06K 9/62* | (2006.01) |
| *G06T 7/00* | (2006.01) |

(52) U.S. Cl.
CPC ..... *G06K 9/6267* (2013.01); *G06T 2207/10152* (2013.01); *G06T 7/0071* (2013.01); *G06T 2207/10016* (2013.01); *G06T 2207/10024* (2013.01); *G06T 2207/30244* (2013.01)
USPC ........................... 382/203; 382/154; 362/317

(58) Field of Classification Search
USPC ......... 382/154, 203, 100, 118, 115, 232, 239, 382/141, 143, 181, 190, 195, 199, 142, 276, 382/285; 702/127, 155, 158, 159; 356/4.01, 356/5.01; 348/46, 42; 362/317, 341, 346, 362/347; 375/E7.166, E7.178, E71.81, 375/E7.209, E7.139, E7.18
See application file for complete search history.

(56) References Cited

U.S. PATENT DOCUMENTS 6,750,860 B1 *  6/2004  Shum et al. ................... 345/419

* cited by examiner

*Primary Examiner* — Sheela Chawan
(74) *Attorney, Agent, or Firm* — Joseph Kolodka

(57) ABSTRACT

A computer implemented method for determining shape from differential motion with unknown reflectance includes deriving a general relation that relates spatial and temporal image derivatives to bidirectional reflectance distribution function BRDF derivatives, responsive to 3D points and relative camera poses from images and feature tracks of an object in motion under colocated and unknown directional light conditions, employing a rank deficiency in image sequences from the deriving for shape determinations, under predetermined multiple camera and lighting conditions, to eliminate BDRF terms; and recovering a surface depth for determining a shape of the object.

10 Claims, 6 Drawing Sheets

Depth From Unknown Directional Lighting + Perspective Camera 302

Modeling
Isotropic BRDF, fixed camera + lighting $\rho(n) = f(n^T s, n^T v)$
Differential stereo relation (one per image):
$$\rho\left(\frac{z}{1+\beta z}\right) + r\left(\frac{1}{1+\beta z}\right) + q$$
$$\boxed{\nabla_u E^T \mu + E_t} \neq (n \times \nabla_n \log\rho)^T \omega$$
$$= [n \times (\alpha\hat{s} + \beta v)]^T \omega$$
$$\alpha = \frac{1}{\|s\|} \frac{\partial(\log f)}{\partial(n^T s)} \text{ and } \beta = \frac{\partial(\log f)}{\partial(n^T v)}$$

Key Steps
Eliminate BRDF and lighting using rank deficiency across >4 images:
$$z = \lambda_0(1 + \beta z) \quad (1)$$

Inhomogeneous Quasilinear PDE
$$\boxed{(\lambda_1 + \lambda_2 z)z_x + (\lambda_3 + \lambda_4 z)z_y + \lambda_4 = 0.} \quad (2)$$

Camera — Object
Light — Object motion

Reconstruction Methods

Method 1:
(i) Recover depth from eqn (1)
(ii) Constrain normals using eqn (2)
(iii) Refine depth by comparing normals to depth derivatives.

Method 2:
(i) Discretize the quasilinear PDE (2)
(ii) Solve for depth as a nonlinear optimization problem using (1) and (2).

Fig. 6

SHAPE FROM DIFFERENTIAL MOTION WITH UNKNOWN REFLECTANCE

RELATED APPLICATION INFORMATION

This application claims priority to both provisional application No. 61/576,059 filed Dec. 15, 2011, the contents thereof are incorporated herein by reference.

BACKGROUND OF THE INVENTION

The present invention relates generally to determining shape, and more particularly, to determining shape from differential motion with unknown reflectance.

Shape from differential motion is solved under the umbrella of known optical flow methods. These optical flow methods rely on brightness constancy assumptions, such as assuming that the local brightness of an image point does not change with variation in lighting and viewing configuration (which is obviously incorrect from a physical point of view). Shape reconstruction methods that account for this variation in brightness attempt to model the image formation as a diffuse reflection, which is inaccurate for most real-world objects.

Accordingly, there is a need for a method that accounts for reflectance behavior as an unknown bidirectional reflectance distribution function BRDF, relate it to image intensities and demonstrate and recover the shape.

BRIEF SUMMARY OF THE INVENTION

The present invention is directed to a computer-implemented method for determining shape from a small, differential motion of an object with an unknown surface reflectance. In the general case, reflectance is an arbitrary function of surface orientation, camera and lighting (henceforth called the bidirectional reflectance distribution function, or the BRDF). The invention solves the shape determination problem under several camera and illumination conditions: (a) Unknown directional lighting, unknown general reflectance with (i) Orthographic projection or (ii) Perspective projection; (b) Colocated lighting with (i) Orthographic projection or (ii) Perspective projection; (c) Area lighting and (d) RGB (red, green, blue)+Depth sensor.

These and other advantages of the invention will be apparent to those of ordinary skill in the art by reference to the following detailed description and the accompanying drawings.

BRIEF DESCRIPTION OF THE DRAWINGS

FIG. 6 is a block diagram detailing depth from unknown directional lighting+perspective camera conditions of block 302 shown in block 300 in FIG. 1.

DETAILED DESCRIPTION

The present invention is directed to a computer-implemented method for determining shape from a small, differential motion of an object with an unknown surface reflectance. In the general case, reflectance is an arbitrary function of surface orientation, camera and lighting (henceforth called the bidirectional reflectance distribution function, or the BRDF). The invention solves the shape determination problem under several camera and illumination conditions: (a) Unknown directional lighting, unknown general reflectance with (i) Orthographic projection or (ii) Perspective projection; (b) Collocated lighting with (i) Orthographic projection or (ii) Perspective projection; (c) Area lighting and (d) RGB (red, green, blue)+Depth sensor.

Figure 1:
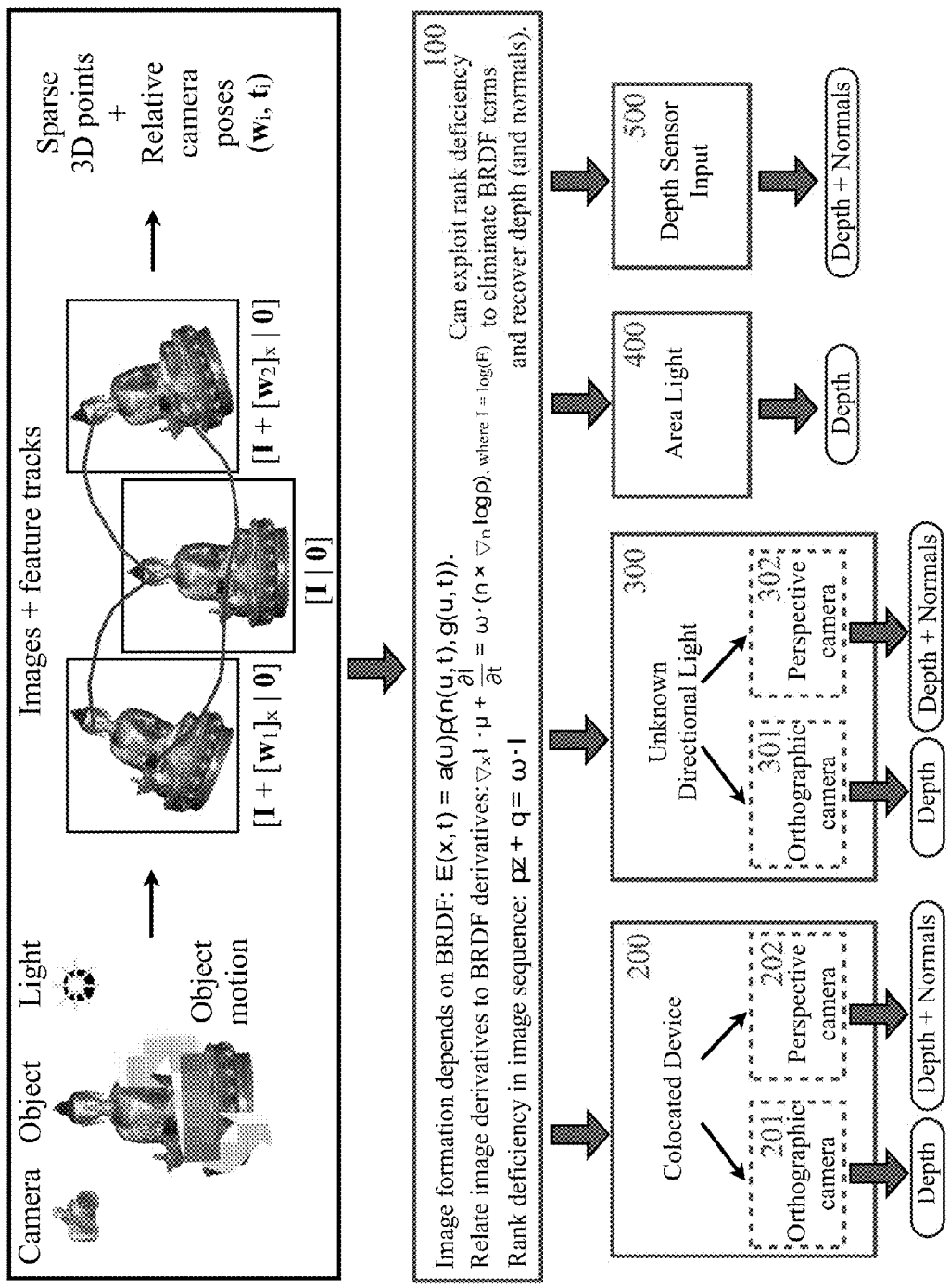
FIG. 1 is a block diagram of the inventive method for determining shape from differential motion with unknown reflectance.

FIG. 1 shows the block diagram of the inventive method for determining shape from differential motion with unknown reflectance. Given an object in motion under certain camera and lighting conditions, images and feature tracks are obtained to provide sparse 3D points and relative camera poses information.

Initially, the inventive method first derives a general relation that relates spatial and temporal image derivatives to BRDF derivatives. Contrary to initial impressions, directly using the relation for shape recovery is not possible due to a rank deficiency 100. Next, the above rank deficiency is exploited to derive solutions, for several camera and lighting conditions, to eliminate BDRF terms and recover depth and normal. For orthographic camera projections 201, 301 the inventive method derives a first-order quasilinear partial differential equation (PDE) which can be solved for surface depth using a method of characteristics. For perspective camera projections 202, 302, depth may be directly recovered by exploiting the rank deficiency, along with an additional PDE that constrains the surface normal. For collocated lighting, two differential pairs suffice for recovering shape. For general directional lighting three differential pairs suffice for recovering shape, without requiring knowledge of lighting. With additional depth sensor input, the inventive method can be used to obtain depth input with surface normal information, thereby improving accuracy.

Figure 2:
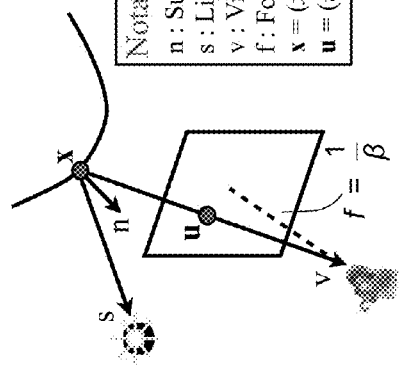
FIG. 2 is a block diagram detailing differential stereo relations block 100 shown in FIG. 1.

Turning now to FIG. 2, there is shown a block diagram detailing differential stereo relations for block 100 shown in FIG. 1. A generalized version of the optical flow relation has been considered others, but only for specific parametric BRDFs and not for solving recovery surface depth as with the invention. In contrast, the invention method derives the relation for general BRDFs and relate it to the surface depth. We observe a rank deficiency in this relation across different images. This rank deficiency can be exploited to recover depth, as explained in following sections. Shown in FIG. 1 is the differential stereo equation $\nabla_u E \, \mu + E_t = (n \times \nabla_n \log \rho)^1 \omega$, where $E = \log(I)$, $\mu$ represents motion field and $\omega$ is angular velocity. The motion field and form of differential stereo relation for orthographic and perspective camera positions are indicated in FIG. 1. In either case, form of $\rho$ is $\rho = E_u \omega_2 - E_v \omega_1$.

As noted hereinabove, the rank deficiency 100 can be used to estimate depth for lighting colocated with the camera 200. An isotropic BRDF in this case depends only on the magnitude of the gradient.

Figure 3:
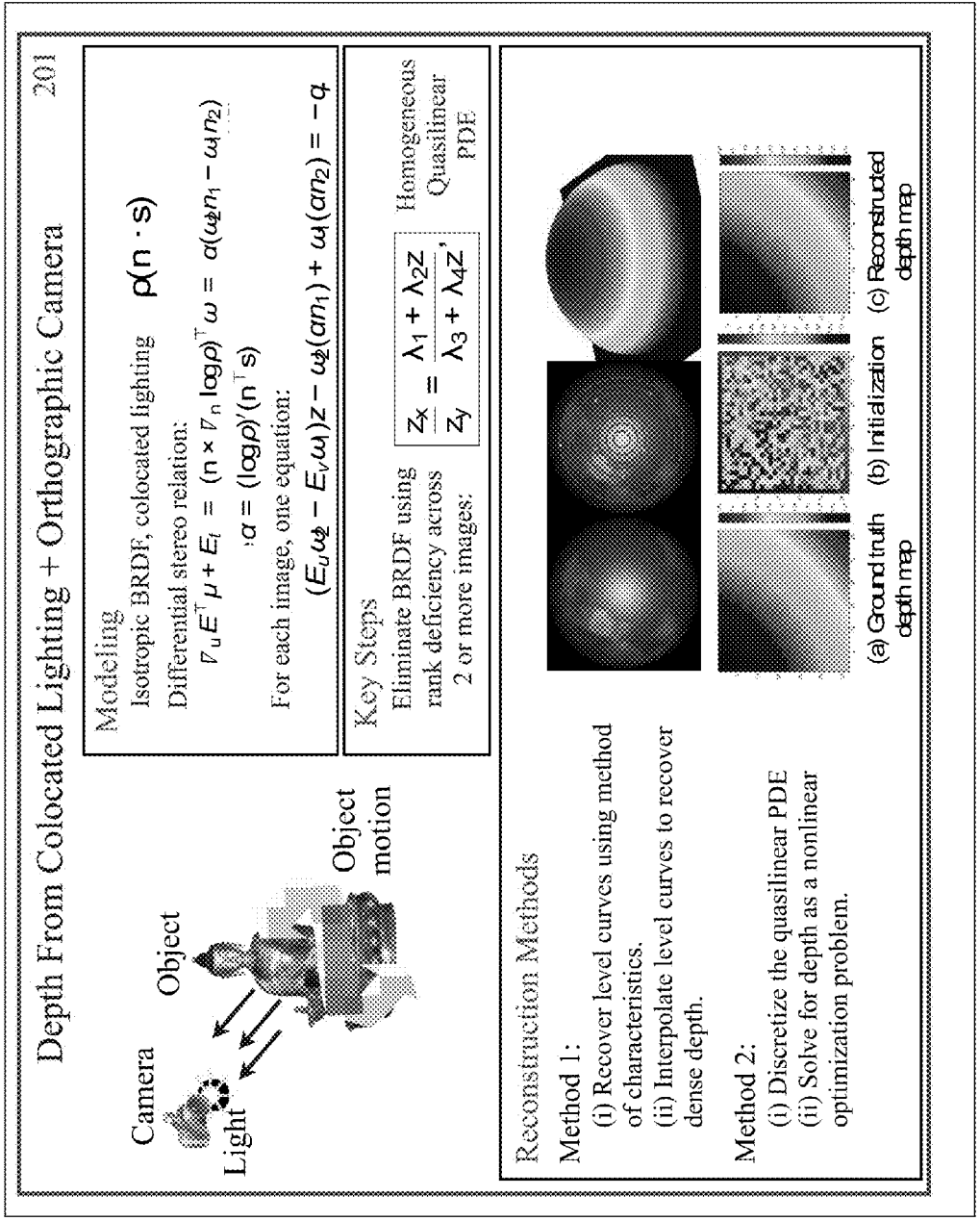
FIG. 3 is a block diagram detailing depth colocated lighting+orthographic camera conditions of block 201 shown in block 200 in FIG. 1.

Referring to the block diagram 201 of FIG. 3, the camera model is orthographic. By using 2 or more differential pairs of images, BRDF terms can be eliminated to derive a homogeneous quasilinear PDE in surface depth, $$\frac{z_x}{z_y} = \frac{\lambda_1 + \lambda_2 z}{\lambda_3 + \lambda_4 z},.$$

This PDE can be solved to recover level curves of the surface using a method of characteristics. The level curves are interpolated to recover dense depth. Alternatively, the quasilinear PDE can be discretized and the solution for depth takes the form of a nonlinear optimization determination.

Figure 4:
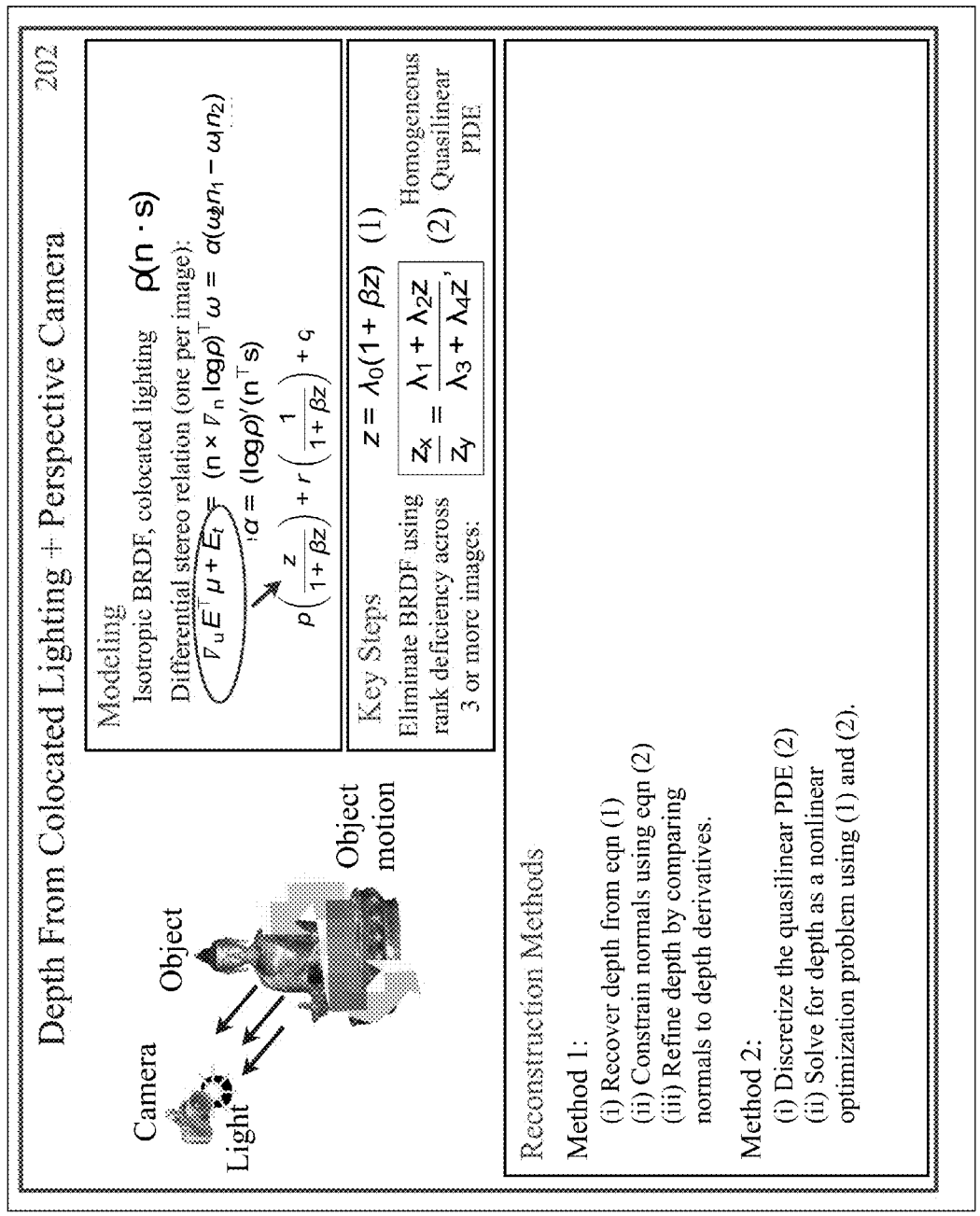
FIG. 4 is a block diagram detailing depth colocated lighting+perspective camera conditions of block 202 shown in block 200 in FIG. 1.

Referring to the block diagram (202) of FIG. 4, the camera model is perspective. By using 3 or more differential pairs of images, BRDF terms can be eliminated to extract two equations. The first equation $z=\lambda_0(1+\beta z)$ (1) directly yields the surface depth, while the second equation, $$\frac{z_x}{z_y} = \frac{\lambda_1 + \lambda_2 z}{\lambda_3 + \lambda_4 z}, \quad (2),$$

is a homogeneous quasilinear PDE in surface depth. Since depth is known from the first equation, the second equation may now be treated as a constraint on the surface normal. The depth is redefined by comparing normal to depth derivatives.

Alternatively the quasilinear PDE according to this second equation is discretized and the solution for depth is an optimization determination problem using the first and second equation (1) and (2).

As noted above in block 300 of FIG. 1, the rank deficiency noted in block 100 can be used to estimate depth for an unknown directional point light source. It is assumed that the object is moving under a fixed camera and light source. An isotropic BRDF in this case depends on the two angles between the (surface normal, light) and (surface normal, camera).

Figure 5:
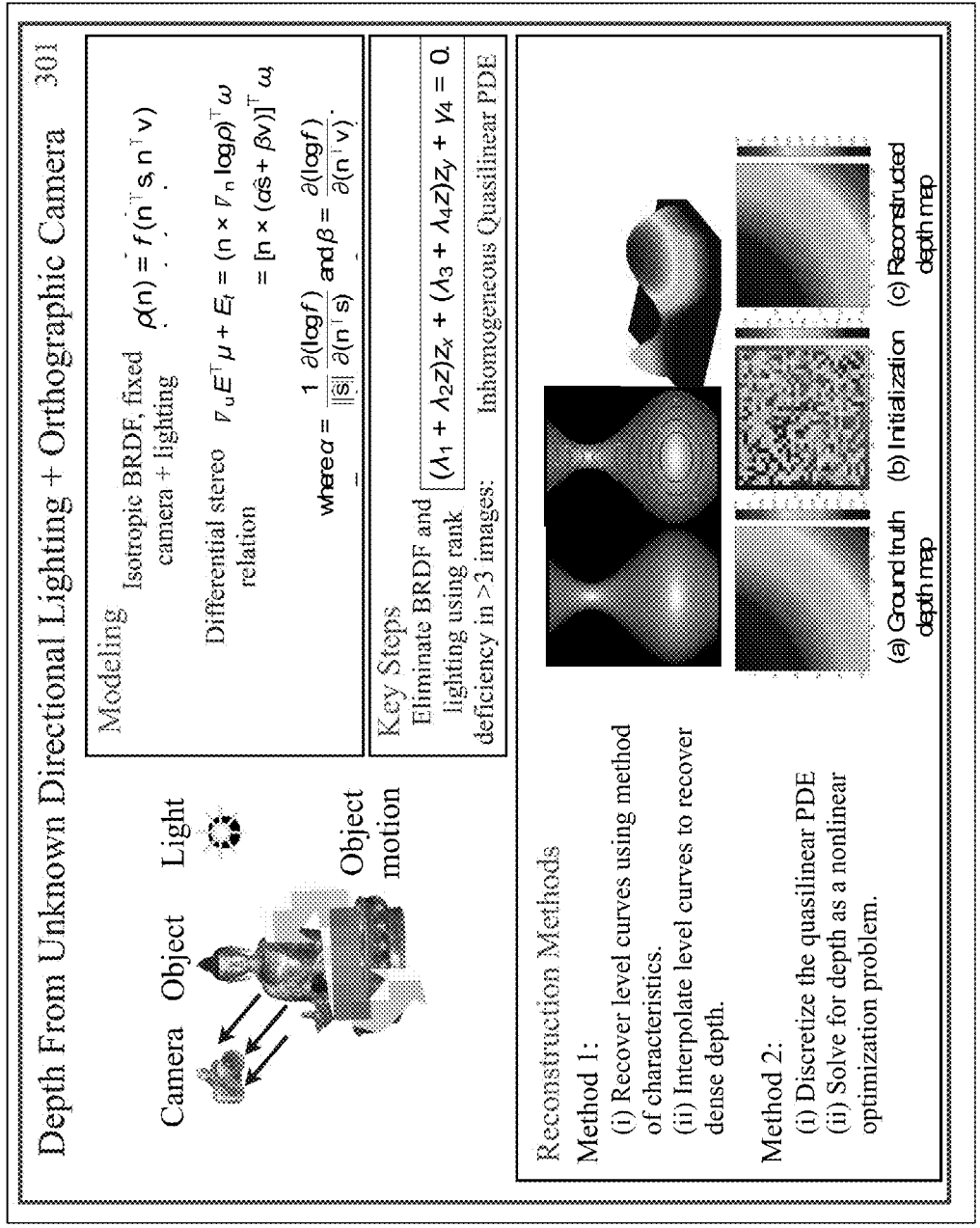
FIG. 5 is a block diagram detailing depth from unknown directional lighting+orthographic camera conditions of block 301 shown in block 300 in FIG. 1.

Referring now to the block diagram 301 of FIG. 5, the camera model is orthographic. Using three (3) or more differential pairs of images, BRDF terms can be eliminated to derive an inhomogeneous quasilinear PDE in surface depth. The inhomogeneous quasilinear PDE is represented by the relationship $(\lambda_1+\lambda_2 z)z_x+(\lambda_3+\lambda_4 z)z_y+Y_4=0$. This PDE can be solved to recover level curves of the surface using a method of characteristics. The level curves are interpolated to recover dense depth.

Referring now to the block diagram 302 of FIG. 6, the camera model is perspective. Using 4 or more differential pairs of images, BRDF terms can be eliminated to extract two equations. The first $z=\lambda_0(1+\beta z)$ (1) directly yields the surface depth, while the second $(\lambda_1+\lambda_2 z)z_x+(\lambda_3+\lambda_4 z)z_y+Y_4=0$. (2) is an inhomogeneous quasilinear PDE in surface depth. Since depth is known from the first equation, the second equation may now be treated as a constraint on the surface normal. The surface depth of the object is refined by comparing normal to depth derivatives.

Referring again to FIG. 1, for an area light source 400, a diffuse BRDF is a quadratic function of the surface normal. The differential stereo relation now becomes a nonlinear PDE in surface depth, which may be solved using nonlinear optimization methods. With a depth sensor 500 and RGB camera input, the differential stereo relation is a decoupled expression in the depth and surface normal. This decoupling can be exploited to configure a more efficient optimization determination, such as an alternating minimization.

From the foregoing, it can be appreciated that it was unknown, prior to this invention, whether shape can be recovered from motion under conditions of general, unknown BRDF and illumination. Therefore, this inventive method is the first of its kind that can handle shape reconstruction under challenging imaging conditions. Prior methods simplify the problem with physically incorrect assumptions like brightness constancy or diffuse reflectance. By correctly accounting for the BRDF, the inventive method improves the accuracy of shape reconstruction.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitle, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for determining shape from differential motion with unknown reflectance, said method comprising the steps of:
    deriving a general relation that relates spatial and temporal image derivatives to bidirectional reflectance distribution function BRDF derivatives, responsive to 3D points and relative camera poses from images and feature tracks of an object in motion under colocated and unknown directional light conditions;
    employing a rank deficiency in image sequences from said deriving step shape determinations, under predetermined multiple camera and lighting conditions, to eliminate BDRF terms; and
    recovering a surface depth for determining a shape of said object responsive to said employing step.

2. The method of claim 1, wherein said recovering step, for orthographic camera projections onto said object in motion, comprises deriving a first-order quasilinear partial differential equation (PDE) which can be solved for said surface depth.

3. The method of claim 2, wherein said recovering step, for perspective camera projections onto said object in motion, comprises directly recovering said surface depth by exploiting said rank deficiency and an additional PDE that constrains a surface normal to said object.

4. The method of claim 3, wherein said additional PDE is defined by $z=\lambda_0(1+\beta z)$.

5. The method of claim 2, wherein said first-order quasilinear partial differential equation (PDE) is defined by $$\frac{z_x}{z_y} = \frac{\lambda_1 + \lambda_2 z}{\lambda_3 + \lambda_4 z}.$$

6. The method of claim 1, wherein said recovering step, for collocated lighting and perspective camera onto said object, comprises employing two partial differential equation PDE pairs for recovering said shape.

7. The method of claim 6, wherein said differential PDE equation pairs comprise $z=\lambda_0(1+\beta z)$ (1) and $$\frac{z_x}{z_y} = \frac{\lambda_1 + \lambda_2 z}{\lambda_3 + \lambda_4 z}. \qquad (2)$$

8. The method of claim 1, wherein said recovering step, for unknown general directional lighting and orthographic camera position onto said object, eliminating BRDF and lighting using rank deficiency in more than 3 images.

9. The method of claim 8, wherein said rank deficiency determination comprises an inhomogeneous quasilinear PDE including $(\lambda_1+\lambda_2 z)z_x+(\lambda_3+\lambda_4 z)z_y+Y_4=0$.

10. The method of claim 1, wherein said recovering step, with additional depth sensor input for said object, comprises obtaining surface normal to said object information enabling improvement of accuracy for determining said shape.

\* \* \* \* \*